United States Patent Office 3,472,887
Patented Oct. 14, 1969

3,472,887
BIS(TRIALKYLPHOSPHINE CARBON DISULFIDE) NICKEL COMPOUND
Jonathan Turner Carriel, Ridgewood, N.J., and Earle Norman Hewitt, Homestead, Pa., assignors to The International Nickel Company, Inc., New York, N.Y., a corporation of Delaware
No Drawing. Filed July 13, 1967, Ser. No. 653,027
Int. Cl. C07f 15/04; A01n 9/36
U.S. Cl. 260—439  2 Claims

ABSTRACT OF THE DISCLOSURE

Bis(tertiary phosphine) nickel dicarbonyl compounds are reacted with carbon disulfide by refluxing the mixture to produce nickel-containing reaction products which have utility in the agricultural chemical field. The nickel-containing reaction product corresponds by elemental analysis to $[P(R)_3 \cdot CS_2]_2Ni$ wherein R is an alkyl when bis(trialkylphosphine) nickel dicarbonyl is reacted with carbon disulfide. When bis(triarylphosphine) nickel dicarbonyl is reacted with carbon disulfide, the reaction product corresponds by elemental analysis to $[P(R_3) \cdot CS_2]Ni$ wherein R is a phenyl.

---

The present invention relates to organo-nickel compounds and the preparation thereof, and more particularly to the reaction products obtained by reacting bis(tertiary phosphine) nickel dicarbonyl with carbon disulfide.

It has now been discovered that a novel composition of matter can be produced by reacting bis(tertiary phosphine) nickel dicarbonyl with carbon disulfide.

It is an object of the present invention to provide a process for obtaining a novel composition of matter.

Other objects and advantages will become apparent from the following description.

Generally speaking, the present invention comprises the nickel-containing reaction products of carbon disulfide and a compound represented by the formula $$[P(R)_3]_2Ni(CO)_2$$

wherein R is a substituent selected from the group consisting of alkyl groups containing from 1 to about 8 carbon atoms and the phenyl group. The nickel-containing organophosphorus compounds of the present invention generally correspond to the formula $[P(R)_3 \cdot CS_2]_xNi$ wherein R is a substituent selected from the group consisting of alkyl groups containing from 1 to about 8 carbon atoms and the phenyl group and wherein $x$ is a whole integer which is 2 when R is an alkyl and is 1 when R is a phenyl. The compounds of the present invention can be prepared by reacting carbon disulfide with a bis(tertiary phosphine) nickel dicarbonyl having the general formula $[P(R)_3]_2Ni(CO)_2$ wherein R is a substituent selected from the group consisting of alkyl groups containing from 1 to about 8 carbon atoms and the phenyl group by establishing a mixture of the bis(tertiary phosphine) nickel dicarbonyl and carbon disulfide.

The reaction of carbon disulfide and the bis(tertiary phosphine) nickel dicarbonyl can be conducted at subatmospheric, atmospheric or superatmospheric pressures and at temperatures at which the mixture of the reactants is liquid. For kinetic reasons, it is advantageous to conduct the reaction at temperatures near the boiling point of the reactant mixture. The kinetics of the reaction can be further increased by dissolving the reactants in an inert solvent which has a boiling point higher than the mixture of the reactants so that the system can be heated to higher temperatures. In order to avoid complex apparatus, the reaction is advantageously conducted at atmospheric pressure and at temperatures near the boiling point of the reactant mixture. The bis(tertiary phosphine) nickel dicarbonyl and a stoichiometric excess of carbon disulfide are added to a reaction vessel which is provided with means for refluxing and the mixture is heated for a sufficient period to assure complete reaction. The excess carbon disulfide is then stripped off and the nickel-containing reaction product recovered.

When a bis(trialkylphosphine) nickel dicarbonyl is reacted with carbon disulfide, a nickel-containing reaction product which by elemental analysis corresponds to $$[P(R)_3 \cdot CS_2]_2Ni$$

wherein R is a substituent selected from the group consisting of alkyl groups containing from 1 to about 8 carbon atoms is obtained. Although the nickel-containing reaction products correspond to aforementioned formula by elemental analyses, ebullioscopic measurements in benzene give values about 3 to 4 times the molecular weight as calculated by the above empirical formula. Furthermore, during the ebullioscopic measurements, the variation of the boiling point of the benzene solution indicated that intermolecular association of one type or another was occurring. Both the departure of the predicted values based on the empirical formula from the ebullioscopic results and the variation of the boiling point of the benzene solution during ebullioscopic measurements indicate that the reaction products of bis(trialkylphosphine) nickel dicarbonyl and carbon disulfide are not simple substances. The reaction of a bis(triarylphosphine) nickel dicarbonyl with carbon disulfide produces a nickel-containing reaction product which by elemental analysis corresponds to $[P(R_3) \cdot CS_2]Ni$ wherein R is a phenyl.

Bis(trialkylphosphine) nickel dicarbonyl compounds such as bis(tributylphosphine) nickel dicarbonyl, bis(trimethylphosphine) nickel dicarbonyl and bis(triethylphosphine) nickel dicarbonyl can be reacted with carbon disulfide to produce the novel compounds of the present invention. Generally, a bis(trialkylphosphine) nickel dicarbonyl can be readily prepared simply by adding the required amounts of nickel tetracarbonyl to a trialkylphosphine which can be dissolved in a solvent such as ethyl ether. When gas evolution ceases, the solvent can be vaporized and the bis(trialkylphosphine) nickel dicarbonyl can be recovered. Bis(triphenylphosphine) nickel dicarbonyl can be prepared in the same manner.

In carrying the invention into practice it is preferred to establish a mixture of at least one bis(tertiary phosphine) nickel dicarbonyl having the general formula $$[P(R)_3]_2Ni(CO)_2$$

wherein R is a substituent selected from the group consisting of alkyl groups containing from 1 to about 8 carbon atoms, and the phenyl group with molar quantities of carbon disulfide equivalent to or in excess of about twice the molar quantity of bis(tertiary phosphine) nickel dicarbonyl. The mixture is refluxed at atmospheric pressure and at a temperature of from about 42° C. to about 48° C. to assure substantially complete reaction. After completion of the reaction any remaining excess carbon disulfide is stripped from the mixture by heating to a temperature of about 42° C. to about 48° C. and the products of reaction are then recovered.

For the purpose of giving those skilled in the art a better understanding of the invention and/or a better appreciation of the advantages of the invention, the following illustrative examples are given:

EXAMPLE I

The reaction of a bis(trialkylphosphine) nickel dicarbonyl with carbon disulfide is shown in this example. A mixture of 100 milliliters of nitrogen-purged carbon disulfide, which is equivalent to about 1.65 moles, and 0.142 mole bis(tributylphosphine) nickel dicarbonyl was established and was refluxed for 16 hours at a temperature of about 42° C. At the end of the 16 hour refluxing treatment, the excess carbon disulfide was stripped off under atmospheric pressure at a temperature which varied between about 42° C. to about 48° C. and was finished under vacuum for 18 hours.

The nickel-containing reaction product analyzed, by weight, 50.0% carbon, 8.6% hydrogen, 9.6% phosphorus, 20.7% sulfur and 10.7% nickel which analysis corresponds to the formula $[P(C_4H_9)_3 \cdot CS_2]_2Ni$. Within the bounds of experimental error, the quantitative yield was 100% of the theoretical amount. The product was a dark brown viscous oil which was immiscible in water and miscible in acetone, benzene, chloroform, ethanol, methanol, pentane, dimethoxyethane, diethoxyethane, carbon tetrachloride, tetrahydrofuran and toluene.

Ebullioscopic measurements in benzene indicated the molecular weight to be about 2200 which was observed at the maximum elevation of the boiling of benzene. During the ebullioscopic measurements, indications that some type of intermolecular associations were taking place were observed.

EXAMPLE II

This example confirms that bis(triarylphosphine) nickel dicarbonyl reacts with carbon disulfide in a manner similar to bis(trialkylphosphine) nickel dicarbonyl. A mixture of 0.04 mole of bis(triphenylphosphine) nickel dicarbonyl and 1.5 moles of carbon disulfide was established. The mixture was refluxed at a temperature of about 42° C. for 18 hours. A solid product of reaction was formed and was extensively washed with carbon disulfide. The solid, nickel-containing reaction product had an elemental composition, by weight, of 57.5% carbon, 3.7% hydrogen, 16.8% sulfur, 7.4% phosphorus and 14.6% nickel, which composition corresponded to the empirical formula

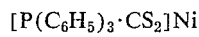

$[P(C_6H_5)_3 \cdot CS_2]Ni$

Calculations based on the empirical formula showed that a yield of about 54.5% had been obtained, i.e., 0.0218 mole or 15.6 grams of the product were formed. The other product or products of reaction that remained in the filtrate or in the wash solution appeared to be impure triphenylphosphine and calculations show that 0.034 mole of triphenylphosphine was formed.

The character of the nickel-containing product of reaction differed markedly from the product of reaction obtained in Example I. For example, the nickel-containing product of reaction of this example was insoluble or difficultly soluble in water, acetone, benzene, chloroform, ethanol, methanol, pentane, dimethoxyethane, diethoxyethane, carbon tetrachloride, tetrahydrofuran and toluene. Since this product of reaction displayed no solubility or very limited solubility in common solvents, no ebullioscopic measurements were made to determine its molecular weight. Upon heating, this nickel-containing product of reaction melted at between about 173° C. and about 175° C. with decomposition.

It is to be observed that the present invention provides a composition of matter derived by reacting at least one bis(tertiary phosphine) nickel dicarbonyl having the general formula $[P(R)_3]_2Ni(CO)_2$ wherein R is a substituent from the group consisting of alkyl groups containing from 1 to about 8 carbon atoms and the phenyl group with an excess of carbon disulfide. The nickel-containing products of reaction appear to be polymers. The compounds of the prseent invention have utility in the agricultural chemical field, in nematocidal, fungicidal and miticidal applications.

The invention also provides a process for reacting carbon disulfide and a bis(tertiary phosphine) nickel dicarbonyl compound to form bis(tertiary phosphine carbon disulfide) nickel. The mixture is maintained at a temperature of about 42° C. and about 48° C. and refluxed to maintain an excess of carbon disulfide. Refluxing is continued until the evolution of carbon monoxide ceases.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A composition of matter which comprises nickel-containing organophosphorus compounds which correspond to the formula $[P(R)_3 \cdot CS_2]_2Ni$ wherein R is an alkyl containing from 1 to about 8 carbon atoms.
2. A composition of matter as described in claim 1 wherein R is an alkyl containing 4 carbon atoms and the nickel-containing organophosphorus compound is bis(tributylphosphine carbon disulfide) nickel.

References Cited

UNITED STATES PATENTS 3,051,694  8/1962  Meriwether et al. ____ 260—94.1

OTHER REFERENCES

Baird et al.: Chemical Communications, No. 2, January 1967, pp. 92–4.

TOBIAS E. LEVOW, Primary Examiner
A. P. DEMERS, Assistant Examiner

U.S. Cl. X.R.
260—999